(12) United States Patent
Uy et al.

(10) Patent No.: US 6,709,716 B2
(45) Date of Patent: Mar. 23, 2004

(54) MICROEMULSION COMPOSITIONS AND METHODS OF MAKING AND USING SAME

(75) Inventors: Rosa Uy, St. Paul, MN (US); Chung I Young, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 72 days.

(21) Appl. No.: 09/844,031

(22) Filed: Apr. 27, 2001

(65) Prior Publication Data

US 2002/0188035 A1 Dec. 12, 2002

(51) Int. Cl.[7] ............ C09J 4/00; C09J 133/00; C08J 7/04; C08L 33/00; C09D 133/00
(52) U.S. Cl. ............ 427/505; 427/516; 522/85; 524/832; 524/831; 524/833
(58) Field of Search ............ 522/84, 85, 86, 522/111, 112; 524/801, 833, 831, 832; 427/516, 508, 505, 496; 428/345, 355 AC

(56) References Cited

U.S. PATENT DOCUMENTS

| | | | |
|---|---|---|---|
| RE24,906 E | 12/1960 | Ulrich | |
| 2,973,826 A | 3/1961 | Barnhart | |
| 3,389,827 A | 6/1968 | Abere et al. | |
| 3,645,835 A | 2/1972 | Hodgson | |
| 3,894,980 A * | 7/1975 | DeTommaso | 524/558 |
| 4,110,290 A * | 8/1978 | Mori et al. | 428/520 |
| 4,112,213 A | 9/1978 | Waldman | |
| 4,268,641 A * | 5/1981 | Koenig et al. | 525/367 |
| 4,289,844 A | 9/1981 | Specht et al. | |
| 4,310,509 A | 1/1982 | Berglund et al. | |
| 4,323,557 A | 4/1982 | Rosso et al. | |
| 4,384,096 A * | 5/1983 | Sonnabend | 526/313 |
| 4,415,564 A * | 11/1983 | Gamba et al. | 514/183 |
| 4,524,087 A | 6/1985 | Engel | |
| 4,527,087 A | 7/1985 | Taya et al. | |
| 4,539,996 A | 9/1985 | Engel | |
| 4,554,924 A | 11/1985 | Engel | |
| 4,564,010 A * | 1/1986 | Coughlan et al. | 604/307 |
| 4,595,001 A | 6/1986 | Potter et al. | |
| 4,618,390 A * | 10/1986 | Powell | 156/307.3 |
| 4,715,382 A | 12/1987 | Strand | |
| 4,732,808 A | 3/1988 | Krampe et al. | |
| 4,771,713 A | 9/1988 | Kinzenbaw | |
| 4,846,185 A | 7/1989 | Carim | |
| 4,848,353 A | 7/1989 | Engel | |
| 4,849,224 A | 7/1989 | Chang et al. | |
| 4,885,294 A | 12/1989 | Ray et al. | |
| 4,917,928 A | 4/1990 | Heinecke | |
| 4,917,929 A | 4/1990 | Heinecke | |
| RE33,353 E | 9/1990 | Heinecke | |
| 5,012,810 A | 5/1991 | Strand et al. | |
| 5,133,356 A | 7/1992 | Bryan et al. | |
| 5,186,938 A * | 2/1993 | Sablotsky et al. | 424/443 |
| 5,230,701 A | 7/1993 | Meyer et al. | |
| 5,238,992 A * | 8/1993 | Outubuddin | |
| 5,270,358 A | 12/1993 | Asmus | |
| 5,505,200 A | 4/1996 | Takaki | |

(List continued on next page.)

FOREIGN PATENT DOCUMENTS

| | | |
|---|---|---|
| EP | 0 051 935 | 5/1982 |
| EP | 0 341 875 | 11/1989 |
| WO | WO 89/07951 | 9/1989 |

*Primary Examiner*—Susan Berman
(74) *Attorney, Agent, or Firm*—John A. Burtis; Daniel R. Pastirik

(57) ABSTRACT

A method for making a bicontinuous, conductive, pressure sensitive adhesive (PSA), such that the starting microemulsion has a convenient viscosity for coating, and such that only a single polmerization step is needed. This has been accomplished by the discovery of a class of thickening agents having a carboxylic acid functionality that are compatible with the microemulsion and yet do not damage the properties of the final adhesive.

21 Claims, 2 Drawing Sheets

U.S. PATENT DOCUMENTS

| | | |
|---|---|---|
| 5,506,059 A | 4/1996 | Robbins et al. |
| 5,571,617 A * | 11/1996 | Cooprider et al. .......... 428/341 |
| 5,670,557 A | 9/1997 | Dietz et al. |
| 5,674,561 A | 10/1997 | Dietz et al. |
| 5,773,485 A | 6/1998 | Bennett et al. |
| 5,779,632 A | 7/1998 | Dietz et al. |
| 5,853,750 A | 12/1998 | Dietz et al. |
| 5,868,136 A * | 2/1999 | Fox et al. ................... 252/500 |
| 5,952,398 A | 9/1999 | Dietz et al. |
| 6,103,316 A * | 8/2000 | Tran et al. ............... 427/208.4 |
| 6,115,625 A * | 9/2000 | Heard et al. ................ 252/500 |

* cited by examiner

MICROEMULSION COMPOSITIONS AND METHODS OF MAKING AND USING SAME

TECHNICAL FIELD

The invention relates generally to compositions made from microemulsions and to methods of preparing and using such compositions.

BACKGROUND OF THE INVENTION

Modern medicine employs many medical procedures where electrical signals or currents are received from or delivered to a patient's body. The interface between medical equipment used in these procedures and the skin of the patient is usually includes a biomedical electrode. Such an electrode typically includes a conductor connected electrically to the equipment and a conductive medium adhered to or otherwise in contact with the patient's skin.

Therapeutic procedures and devices that make use of biomedical electrodes include transcutaneous electronic nerve stimulation (TENS) devices for pain management; neuromuscular stimulation (NMS) techniques for treating conditions such as scoliosis; defibrillation electrodes for dispensing electrical energy to a chest cavity to defibrillate the heart; and dispersive electrodes to receive electrical energy dispensed into an incision made during electrosurgery.

Diagnostic procedures that make use of biomedical electrodes include electrocardiograms (ECGs) for monitoring heart activity and diagnosing heart abnormalities.

For each diagnostic, therapeutic, or electrosurgical procedure, at least one biomedical electrode having an ionically conductive medium containing an electrolyte is adhered to or otherwise placed in contact with mammalian skin at a location of interest and also electrically connected to electrical diagnostic, therapeutic, or electrosurgical equipment. A critical component of the biomedical electrode is the conductive medium serving as the interface between mammalian skin and diagnostic, therapeutic, or electrosurgical equipment.

A long understood difficulty in formulating these conductive media is the need to balance conductivity with patient skin adhesion. The best formulations for providing conductivity are typically hydrophilic and need water or an aqueous ionic system to provide required ionic conductivity between the skin and the electrical diagnostic, therapeutic, or electrosurgical instrumentation. However, the best formulations for providing skin adhesion are typically hydrophobic in nature. The art has typically balanced these properties in a particular electrode in a way that optimizes neither skin adhesion nor conductivity.

One method for bypassing this tradeoff is to provide a conductive pressure sensitive adhesive having bicontinuous hydrophilic and hydrophobic regimes. Such adhesives can be formed by way of a microemulsion, and the making and use of such adhesives are taught in coassigned U.S. Pat. Nos. 5,670,557; 5,674,561; 5,779,632; 5,853,750; and 5,952,398, which are hereby incorporated by reference.

While these adhesives have generally acceptable properties after compounding, they have at least one drawback during the process of preparation. Because of the low viscosity of the microemulsion solutions (e.g., less than 50 centipoise), it is not easy to dispense them in a thick, uniform coating on an electrode backing. The hydrophilic and hydrophobic portions of the finished bicontinuous adhesive composition are formed simultaneously when polymerization is initiated in both phases of a microemulsion. Before the polymerization, the composition is inconveniently thin for conventional coating techniques; after polymerization the composition is inconveniently viscous.

This is particularly disadvantageous for biomedical electrodes, where a thick, uniform coating is desired. The thick coating provides proper adhesion and prevents electrodes from rapid dry-out. When bicontinuous adhesives are used for wound dressing, the thick coating provides absorbing capacity. When used for drug delivery, the thick coating is important for drug loading.

In practice, the difficulty is resolved by inducing a partial polymerization of the microemulsion, just enough to bring the viscosity of the composition up to a level appropriate for convenient coating by, e.g., a conventional knife coater. A final polymerization step is induced in the coated material, resulting in the finished bicontinuous adhesive. The process is analogous to that discussed in coassigned U.S. Pat. No. 5,773,485 which is hereby incorporated by reference. Though cumbersome, such a process forms a uniform, thick coating of a pressure sensitive adhesive that simultaneously has good conductivity and good skin adhesion.

However, the extra steps involved in arranging for the first, partial polymerization are burdensome and increase the cost of the finished electrode to the medical consumer. This shortcoming cannot readily be achieved by the indiscriminate addition of thickening agents, as such compounds generally tend to destabilize the microemulsion during coating.

SUMMARY OF THE INVENTION

The present invention provides a method for making bicontinuous, conductive, pressure sensitive adhesives (PSAs) that have convenient coating viscosities and that require only a single polymerization step. This is accomplished by the use of a class of thickening agents that is compatible with the microemulsions and does not damage the properties of the final adhesives.

More particularly, in one aspect, the invention provides polymerizable compositions comprising: (a) an aqueous microemulsion comprising one or more hydrophoblic monomers, one or more hydrophilic and/or amphiphilic monomers, one or more initiators; and (b) at least one thickening agent comprising a polymer or copolymer of acrylic acid.

In another aspect, the invention provides methods of forming a polymerized microemulsion pressure sensitive adhesive composition in contact with a substrate, the methods generally comprising the steps of:

(1) providing an aqueous microemulsion comprising one or more hydrophoblic monomers, one or more hydrophilic and/or amphiphilic monomers and one or more initiators;

(2) combining the aqueous microemulsion with at least one thickening agent comprising a polymer or copolymer of acrylic acid;

(3) coating the thickened microemulsion onto the substrate; and (4) irradiating the microemulsion in order to form the pressure sensitive adhesive composition in contact with the substrate.

In still another aspect, the invention provides methods of forming a polymerized microemulsion pressure sensitive adhesive composition in contact with a substrate, the methods generally comprising the steps of:

(1) mixing hydrophilic monomer(s) and/or amphiphilic monomer(s) in a weight percent ratio of from about 100/0 to about 0/100 to form a first mixture;

(2) mixing hydrophobic monomer(s), having a glass transition temperature suitable for forming a hydrophobic pressure sensitive adhesive, into the first mixture in a weight percent ratio of from about 80/20 to about 10/90 hydrophobic monomers/first mixture to form a second mixture;

(3) mixing surfactant(s) into the second mixture in a weight percent ratio of from about 5/95 to about 30/70 surfactant/second mixture to form a third mixture;

(4) mixing initiator(s) into the third mixture in a weight percent ratio of from about 0.01/99.99 to about 2/98 initiator/third mixture to form a fourth mixture, (5) independently, mixing water and water-soluble or water-dispersible additives together in a weight percent ratio of from about 100/0 to about 80/20 to form an aqueous mixture;

(6) mixing the aqueous mixture and the fourth mixture together in a weight percent ratio of from 5/95 to about 50/50 aqueous mixture/fourth mixture to form a microemulsion;

(7) mixing the microemulsion with a thickening agent comprising a polymer or copolymer of acrylic acid monomer together in a weight ratio of from about 0.5/99.5 to about 5/95 to form a thickened microemulsion;

(8) coating the thickened microemulsion onto the substrate; and (9) irradiating the microemulsion in order to form the pressure sensitive adhesive composition in contact with the substrate.

In still other aspects, the invention provides pressure sensitive adhesives, biomedical electrodes, medical skin coverings and pharmaceutical delivery devices made from the above-described compositions and according to the above-described methods.

DETAILED DESCRIPTION PREFERRED EMBODIMENTS

Figure 1:
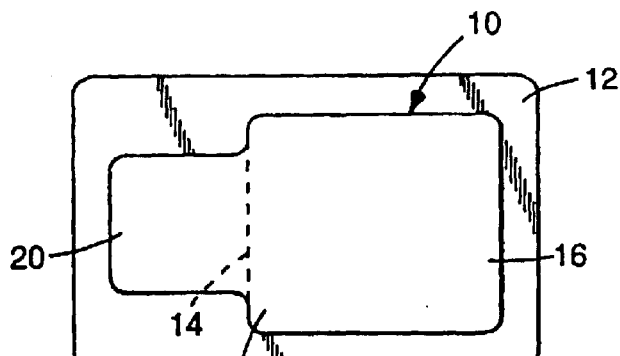
FIG. 1 is a top plan view of a biomedical electrode containing a polymerized microemulsion PSA of the present invention, used for diagnosis or monitoring of heart conditions of a mammalian patient.

The present invention provides a method for making a bicontinuous, conductive, pressure sensitive adhesive (PSA) by way of a microemulsion that has a convenient viscosity for coating. The polymerized microemulsion PSA's according to the present invention are derived from concurrent polymerization of a free-radically polymerizable hydrophilic or amphiphilic monomer or oligomer in the aqueous (water) phase of a microemulsion and a concurrent polymerization of a free-radically polymerizable hydrophobic monomer in the organic (oil) phase to form a PSA. Preferably, the PSA has a bicontinuous structure and even more preferably has two solid, substantially nonporous bicontinuous phases. The choice of hydrophobic monomers and the choice of weight percents used to form the polymer may be selected to optimize pressure sensitive adhesive properties of the resulting composition.

A preferred polymerized microemulsion PSA of the present invention with a substantially nonporous, bicontinuous structure would find utility especially in applications where the bulk properties of both hydrophilic polymers and hydrophobic polymers PSA's are required simultaneously.

I. Aqueous Phase

In general, the polymerizable microemulsion compositions of the invention include an aqueous phase that comprises water, free radically (co)polymerizable ethylenically unsaturated polar hydrophilic or amphiphilic monomer(s) or oligomer(s), optional water soluble initiator, and optional water soluble additive.

I.a. Water

The microemulsion compositions generally comprises from about 2 to about 50 percent by weight of water, preferably about 5 to about 30 percent by weight, and, most preferably about 6 to about 25 percent by weight, based upon the total weight of the microemulsion. Preferably the microemulsion comprises deionized water. The water phase may also include water-soluble and/or water-dispersible additives selected for properties of the PSA in ultimate usage. To determine the most appropriate weight percent of water to be included in the microemulsion, the water can be added incrementally until a clear microemulsion region is reached.

I.b. Free-Radically (Co)Polymerizable Ethylenically-Unsaturated Polar Species

The aqueous phase of the present invention comprises at least one free-radically polymerizable ethylenically-unsaturated polar monomer or oligomer. The polar monomers or oligomers can be oil insoluble (hydrophilic) or can be both water soluble and oil soluble (amphiphilic). Preferably, use of polar oligomers in the aqueous phase promotes formation of a substantially nonporous bicontinuous structure for the polymerized microemulsion PSA of the present invention.

Monomers are generally selected from the group consisting of polar monomers which are substantially insoluble in the oil phase and polar monomers other than oil-insoluble monomers (i.e., polar monomers which are both water soluble and oil soluble).

The microemulsion compositions will cumulatively comprise from about 2 to about 90 percent by weight of the required hydrophilic or amphiphilic monomers or oligomers preferably from about 5 to about 70 percent by weight, and most preferably from about 10 to about 60 weight percent, based upon the total weight of the microemulsion, depending upon the desired properties of the polymerized microemulsion PSA.

I.b.i. Polar Ethylenically-Unsaturated Free-Radically (Co)Polymerizable Oligomers Useful polar ethylenically-unsaturated free-radically (co) polymerizable oligomers which are substantially insoluble in the oil phase or which are both water soluble and oil soluble include but are not limited to polyethylene oxide acrylates, polyethylene oxide diacrylates, polyethylene glycol acrylates, polyethylene glycol diacrylates, polyurethane acrylates, polyurethane diacrylates, N-vinylpyrrolidone macromer, and mixtures thereof. The polyethylene oxide acrylates and diacrylates are preferred. The most preferred oligomer comprises polyethylene oxide acrylate because of availability and ease of formulation. Useful oligomers typically have a number average molecular weight of about 100 to about 100,000, preferably about 100 to about 60,000, and most preferably about 100 to about 5000 for optimal physical properties (e.g., water absorption, nonporosity, strength) of the polymer composite preferably having a substantially nonporous, bicontinuous structure.

I.b.ii. Substantially Oil-Insoluble Free-Radically (Co)Polymerizable Ethylenically-Unsaturated Polar Monomers A first type of optional polar monomer is a water-soluble free-radically (co)polymerizable ethylenically-unsaturated polar monomer that is substantially insoluble in the oil phase. "Substantially oil-insoluble" and "water-soluble" both mean that the monomer has a solubility of less than about 0.5% by weight in the oil phase and exhibits a distribution ratio at a given temperature (preferably about 25° to 35° C.) of concentration in the oil phase to concentration in the aqueous phase of less than about 0.005. Such monomer may be nonionic, e.g., acrylamide, or may be ionic. Mixtures of nonionic and ionic monomers may be used. Ionic monomers conforming to these criteria include but are not limited to sodium styrene sulfonate, potassium acrylate, sodium acrylate, sodium methacrylate, ammonium acrylate, sodium 2-acrylamido-2-methylpropane sulfonate, 4,4,9-trimethyl-4-azonia-7-oxa-dec-9-ene-1-sulfonate, N,N-dimethyl-N-(beta-methacryloxyethyl)ammonium propionate betaine, trimethylamine methacrylamide, 1,1-dimethyl-1-(2,3-dihydroxypropyl)amine methacrylamide, and other zwitterionic ethylenically-unsaturated monomers having the requisite solubility requirements, mixtures thereof, and the like. Preferred oil-insoluble polar monomers include those selected from the group consisting of acrylamide, sodium styrene sulfonate, sodium acrylate, sodium 2-acyrlamido-2-methylpropane sulfonate, sodium methacrylate, and mixtures thereof, due to ease of formulation and desirable properties when polymerized.

I.b.iii. Free-Radically (Co)Polymerizable Ethylenically-Unsaturated Polar Monomers Other Than I.b.ii.

Many polar monomers known in the art exhibit some solubility in both water and oil. They can have a solubility of about 0.5% or greater in the oil phase and exhibit a distribution ratio at a given temperature (preferably about 25° C. to 30° C.) of concentration in the oil phase to a concentration in the aqueous phase of greater than or equal to about 0.005. Useful polar ethylenically-unsaturated free-radically (co)polymerizable monomers partitionable between the aqueous phase and the oil phase of the microemulsion of this invention include but are not limited to N-vinylpyrrolidone, N-vinylcaprolactam, (meth)acrylic acid, hydroxyethyl (meth)acrylate, itaconic acid, styrene sulfonic acid, N-substituted acrylamides, N,N-disubstituted acrylamides, N,N-dimethylaminoethyl methacrylate, 2-acrylamido-2-methyl propane sulfonic acid, and mixtures thereof. Preferred polar partitionable monomers include (meth)acrylic acid, N-vinylpyrrolidone, N-vinylcaprolactam, N,N-dimethylaminoethyl methacrylate, N,N-dimethylacrylamide, styrene sulfonic acid, 2-acrylamido-2-methyl propane sulfonic acid, and mixtures thereof. Most-preferred polar partitionable monomers include acrylic acid, N-vinylpyrrolidone, N-vinylcaprolactam, N,N-dimethylacrylamide, and mixtures thereof, because of the favorable properties, such as physical strength, they can impart to the biphasic polymer composite.

I.c. Water-Soluble Initiators

The aqueous phase may optionally further comprise a water-soluble free-radical polymerization initiator selected from the group consisting of thermal initiators, photoinitiators, and mixtures thereof.

I.c.i. Water-Soluble Photoinitators

Water-soluble photoinitiators useful in the present invention are photoinitiators which generate free radicals on exposure to electromagnetic (usually ultraviolet) radiation which act as initiators for the (co)polymerization of the hydrophilic monomer(s), the oleophilic monomer(s), the (co)polymerizable oligomers, and, when present, the (co)polymerizable surfactant as detailed below. Useful water-soluble photoinitiators include but are not limited to benzophenones substituted with an ionic moiety, a hydrophilic moiety or both; thioxanthones substituted with an ionic moiety, a hydrophilic moiety or both, and 4-substituted-(2-hydroxy-2-propyl)phenyl ketones, wherein the 4-substituent is an ionic or hydrophilic moiety. Such ionic or hydrophilic moieties include but are not limited to hydroxyl groups, carboxyl groups, and carboxylic acid salt groups. Useful water-soluble benzophenones include but are not limited to 4-trimethylaminomethyl benzophenone hydrochloride and benzophenone sodium 4-methanesulfonate. Useful water-soluble thioxanthones include but are not limited to 3-(2-hydroxy-3-trimethylaminopropoxy)thioxanthone hydrochloride, 3-(3-trimethylaminopropoxy)thioxanthone hydrochloride, thioxanthone 3-(2-ethoxysulfonic acid) sodium salt, and thioxanthone 3-(3-propoxysulfonic acid) sodium salt. Useful water-soluble phenyl ketones include but are not limited to (2-hydroxy-2-propyl)(4-diethylene glycol phenyl)ketone, (2-hydroxy-2-propyl)(phenyl-4-butanecarboxylate)ketone, 4-(2-hydroxethoxy)phenyl-(2-propyl)ketone, and their water-soluble salts. A preferred water-soluble photoinitiator is 4-trimethylaminomethyl benzophenone hydrochloride.

The aqueous phase may comprise about 0.05 to about 1 part by weight of a photoinitiator, when used, and preferably about 0.1 to about 1 part by weight based on 100 parts by weight of total (co)polymerizable species in the microemulsion.

I.c.ii. Water-Soluble Initiators

Water-soluble initiators useful in the invention include initiators which, on exposure to heat, generate free-radicals which initiate (co)polymerization of the hydrophilic monomer(s), the oleophilic monomer(s), the (co)polymerizable oligomer and, when present, the (co)polymerizable surfactant, as detailed below. Suitable water-soluble thermal initiators include but are not limited to potassium persulfate, ammonium persulfate, sodium persulfate, and mixtures thereof; oxidation-reduction initiators such as the reaction product of the above-mentioned persulfates and reducing agents such as sodium metabisulfite and sodium bisulfite; and 4,4'-azobis(4-cyanopentanoic acid) and its soluble salts (e.g., sodium, potassium). A preferred water-soluble thermal initiator is ammonium persulfate. Preferably, most water-soluble thermal initiators are used at temperatures of from about 50° to about 70° C., while the oxidation-reduction-type initiators are used at temperatures of from about 30° to about 50° C. When used, water-soluble thermal initiators may comprise from about 0.05 to about 1 part by weight, preferably about 0.1 to about 1 part by weight based on 100 parts by weight of (co) polymerizable species in the microemulsion composition.

I.d. Water-Soluble Additives

The aqueous phase may optionally further comprise various water-soluble additive(s) in order to produce a polymerized microemulsion PSA having specific properties and/or appearance. Each additive is selected to produce a desired end-product. For example, if a conductive polymer is desired, an electrolyte can be added. If a pigmented polymer is desired, a dye can be added. Examples of useful additives include but are not limited to water-soluble crosslinkers (such as methylene bisacrylamide), plasticizers (such as glycerin and polyalkylene glycols), pH adjusters, electrolytes, dyes, pigments, pharmaceutically-active compounds, physiologically-active compounds, cosolvents, noncopolymerizable polar oligomers, mixtures thereof, and the like. In particular, electrolytes including but not limited to potassium chloride, lithium chloride, sodium chloride, and mixtures thereof have been found to be useful in various formulations of the present invention when it is desired that the polymerized microemulsion PSA exhibit electrical conductivity. Up to about 10 parts by weight of an electrolyte can be included, preferably about 0.5 parts by weight to about 5 parts by weight based on 100 parts by weight of the total aqueous phase.

Noncopolymerizable polar oligomers useful as additives include but are not limited to poly(N-vinylpyrrolidone), polyethylene glycols, poly(oxyethylene) alcohols, poly (ethylimine), and mixtures thereof. Such oligomers are added to affect the bulk properties of the resulting polymerized microemulsion PSA, e.g., to impart hydrophilic properties to the material.

Typical cosolvents include aliphatic alcohols having from about 1 to about 8 carbon atoms (such as glycerin), polyethers (such as Butyl Cellosolve™, Butyl Carbitol™, Hexyl Cellosolve™, and Hexyl Carbitol™ all commercially available from Union Carbide), and mixtures thereof.

It will be recognized that essentially all organic water soluble additives which are added to the aqueous phase will exhibit a degree of solubility in the organic phase of the microemulsion. Each additive has its own distribution ratio between the aqueous phase and the organic phase. Thus, unless otherwise specified, the above-mentioned constituents of the aqueous phase will be found in and will affect the properties of the organic phase also. It is not necessary to the understanding and practice of the present invention to quantify the particular distribution ratio of each and every additive mentioned heretofore.

II. Oil Phase

The terms "organic phase", "oil phase", and "lipophilic phase" are used interchangeably herein.

Prior to commencing polymerization, the oil phase of the microemulsion compositions of the invention comprises hydrophobic free-radically (co)polymerizable monomers suitable for forming a hydrophobic pressure sensitive adhesive homopolymer or copolymer, free radically (co) polymerizable polar monomer, oil-soluble initiator, and optional reactive lipophilic additives.

II.a. Hydrophobic Free-Radically (Co)Polymerizable Monomers

Hydrophobic free-radically polymerizable, ethylenically-unsaturated monomers useful in the lipophilic phase of the microemulsions of the present invention include but are not limited to those selected from the group consisting of about C1 to about C18 alkyl esters of acrylic acid, i.e., those esters derived from acrylic acid and about C1 to about C18 alcohols, provided that such monomers are suitable for forming a hydrophobic polymer having pressure sensitive adhesive properties.

The glass transition temperature ($T_g$) of the resulting polymerized microemulsion PSA can be determined according to techniques known to those skilled in the art. The $T_g$ of the resulting polymerized microemulsion PSA is contributed by selection of hydrophobic monomers suitable for forming a hydrophobic polymer having pressure sensitive adhesive properties. A $T_g$ of less than about 10° C. will frequently provide a resulting hydrophobic polymer having pressure sensitive adhesive properties. A $T_g$ of less than about 0° C. will more frequently provide a resulting hydrophobic polymer having pressure sensitive adhesive properties. A $T_g$ of less than about −10° C. will most frequently provide a resulting hydrophobic polymer having pressure sensitive adhesive properties.

Of these possible hydrophobic monomer candidates, alkyl acrylates, including isooctyl acrylate, 2-ethylhexyl acrylate, and n-butyl acrylate, are particularly preferred because of their availability for use and because of the $T_g$ of the resulting hydrophobic polymer formed from such hydrophobic monomers.

The organic phase may further optionally comprise free-radically polymerizable ethylenically-unsaturated comonomers which are copolymerizable with the alkyl acrylate monomers described above in order to modify the glass transition temperature ($T_g$) of the resulting polymerized microemulsion PSA, from that $T_g$ contributed by the hydrophobic monomer(s). Preferred comonomers include styrene, acrylonitrile, and vinyl esters (such as vinyl acetate, vinyl propionate and vinyl neopentanoate, etc.) with the selection of the comonomer dependent on the properties desired of the final solid bicontinuous polymer.

The polymerized microemulsion PSAs of the invention generally comprise from about 5 to about 80 percent by weight of hydrophobic monomers, preferably from about 10 to about 70 percent by weight, and most preferably from about 12 to about 60 percent by weight based on the total weight of the microemulsion, in order to impart sufficient strength, cohesiveness, and pressure sensitive adhesive properties to the resulting polymerized microemulsion PSA prepared therefrom.

As has been stated previously, the percent composition of each constituent of the microemulsion will be determined by the skilled practitioner based on the desired pressure sensitive adhesive properties of the copolymer.

II.b. Free-Radically (Co)Polymerizable Polar Monomer

The organic phase of the microemulsion compositions will contain a portion of the free-radically polymerizable polar monomers described under I.b.ii. and I.b.iii., above, if used, because of the partitioning of such organic materials between the aqueous phase and the organic phase of a microemulsion, as described previously. Each monomer described therein exhibits its own distribution ratio, the enumeration of which is not necessary for the understanding and practicing of the present invention.

II.c. Oil-Soluble Initiators

The oil phase comprises an oil-soluble free-radical photopolymerization initiator ("photoinitiator") and optionally further comprises a thermal initiator.

II.c.i. Oil-Soluble Photoinitiators

Useful oil-soluble photoinitiators generally include those that generate free radicals on exposure to electromagnetic (usually ultraviolet) radiation which act as initiators for the (co)polymerization of the hydrophilic monomer(s) and/or oligomer(s), the oleophilic monomer(s), and, when present, the (co)polymerizable surfactant. Useful photoinitiators include, but are not limited to: (1) mixtures of Michler's ketone and benzil or benzophenone, preferably in a weight ratio of about 1:4; (2) coumarin-based photoinitiator systems as described in U.S. Pat. No. 4,289,844, incorporated by reference herein; and (3) systems based on dimethoxyphenylacetophenone and/or diethoxyacetophenone. The oil-soluble photoinitiators are initially included in the microemulsions as part of the organic phase. On irradiation, the free-radicals thus generated effect (co)polymerization of monomers in both the aqueous and the organic phases, as well as copolymerization of the (co)polymerizable surfactant.

The organic phase comprises about 0.01 to about 5 parts by weight of an oil soluble photoinitiator, based on 100 parts by weight of total (co)polymerizable species in the microemulsion.

II.c.ii. Optional Oil-Soluble Thermal Initiators

Oil-soluble thermal initiators may optionally be used in the preparation of the bicontinuous polymers of the present invention subsequent to the photopolymerization step as described above in order to complete the polymerization reaction.

Useful oil-soluble thermal initiators include those that, on exposure to heat, generate free radicals which initiate (co) polymerization of the hydrophilic monomer(s), oligomer(s) the oleophilic monomer(s), and, when present, the polymerizable surfactant, as detailed below. Suitable oil-soluble thermal initiators include but are not limited to those selected from the group consisting of azo compounds such as Vazo 64™ (2,2'-azobis(isobutyronitrile) and Vazo 52™ (2,2'-azobis(2,4-dimethylpentanenitrile)), both available from duPont, peroxides such as benzoyl peroxide and lauroyl peroxide, and mixtures thereof. A preferred oil-soluble thermal initiator is (2,2'-azobis(isobutyronitrile)).

The organic phase may comprise about 0 to about 5 parts by weight of an oil-soluble thermal initiator, typically about 0.05 to about 5 parts by weight when used, preferably about 0.1 to about 5 parts if used, based on 100 parts of total weight of (co)polymerizable compounds in the microemulsion.

II.d. Optional Reactive Lipophilic Additives

The organic phase may optionally further comprise one or more additional free-radically reactive constituents, including, but not limited to oil-soluble crosslinking agents, chain transfer agents, and mixtures thereof. Examples of useful crosslinking agents include but are not limited to those selected from the group consisting of divinylbenzene; about $C_4$ to about $C_8$ alkyl diacrylates such as 1,4-butanediol diacrylate, 1,6-hexanediol diacrylate, 1,8-octanediol diacrylate; and mixtures thereof. A preferred crosslinking agent is 1,6-hexanediol diacrylate. The crosslinking agent, if added, changes the physical properties, such as cohesive strength, of the final polymer. The organic phase optionally further comprise about 0 to about 10 or more, parts by weight crosslinker, typically, if used, about 0.1 to about 2 percent by weight, based on 100 parts by weight of the total oil phase. The amount of crosslinker used will determine the physical properties of the polymer, such as insolubility in solvents, modulus, and internal strength. For such applications, the organic phase typically comprises about 0.1 to about 5 parts by weight of a crosslinker, based on 100 parts by weight of the oil phase. One of ordinary skill in the art will be able to determine the proper amount of crosslinker to obtain desired physical properties, and such an artisan will understand that there is no practical upper limit on the amount of crosslinker which can be used in the formulations of the present invention.

The organic phase may optionally further comprise a chain transfer agent. Examples of useful chain transfer agents include carbon tetrabromide, alcohols, mercaptans, and mixtures thereof. When present, a preferred chain transfer agent is isooctylthioglycolate. The oil phase may further comprise up to about 0.5 parts by weight of a chain transfer agent, typically about 0.01 weight percent to about 0.5 parts by weight, if used, preferably about 0.05 parts by weight to about 0.2 parts by weight, based upon 100 parts by weight of the total oil phase.

II.e. Optional Nonreactive Lipophilic Additives

The oil phase may optionally further comprise one or more nonreactive oil-soluble additives. A variety of nonreactive oil-soluble additives may be included in the microemulsion. These materials are added to produce a final polymer system with specified physical properties or appearance. Examples of such optional oleophilic additives include but are not limited to those selected from the group consisting of plasticizers, such as one of the phthalate esters well-known in the art. The oil phase may optionally further comprise about 0 to about 20 parts by weight of a plasticizer, typically about 5 to about 20 parts by weight if used, preferably about 8 to about 15 weight percent based on 100 parts by weight of the oil phase.

III. Surfactants

Nonionic and ionic (anionic and cationic) surfactants are generally also employed in the present invention to prepare the microemulsion compositions. The surfactant(s) can be copolymerizable with the monomers present in the microemulsion or noncopolymerizable. The surfactant(s) are preferably copolymerizable so that the resulting polymerized microemulsion is less sensitive to water. When resistance to water is not required, noncopolymerizable surfactants are preferred due to their generally lower cost.

1. Nonionic Surfactants

The nonionic surfactants are usually condensation products of an organic aliphatic or alkylaromatic hydrophobic compound and an alkylene oxide, such as ethylene oxide, which is hydrophilic. Almost any hydrophobic compound having a carboxy, hydroxy, amido, or amino group with a free hydrogen present can be condensed with ethylene oxide to form a nonionic surfactant. The length of the ethylene oxide chain of the condensation product can be adjusted to achieve the desired balance between the hydrophobic and hydrophilic elements (Hydrophilic-Lipophilic Balance or HLB). The HLB of a surfactant is an expression of the balance of the size and strength of the hydrophilic (water-loving or polar) and the lipophilic (oil-loving or non-polar) groups of the surfactant. The useful HLB of nonionic surfactants for the present invention to prepare microemulsions is from about 6 to about 19, preferably from about 9 to about 18, and most preferably from about 10 to about 16. Useful nonionic surfactants include non(co)polymerizable nonionic surfactants, ethylenically-unsaturated copolymerizable nonionic surfactants, and mixtures thereof.

1.a. Non(co)polymerizable Nonionic Surfactants

Particularly suitable nonreactive nonionic surfactants include condensation products of a higher aliphatic alcohol, such as a fatty alcohol, containing about 8 to about 20 carbon atoms, in a straight or branched chain configuration, condensed with about 3 to about 100 moles, preferably about 5 to about 40 moles, most preferably about 5 to about 20 moles of ethylene oxide to achieve the above defined HLB. Examples of such nonionic ethoxylated fatty alcohol surfactants are the Tergitol™ 15-S series from Union Carbide and Brij™ surfactants from ICI. Tergitol™ 15-S Surfactants include $C_{11}$–$C_{15}$ secondary alcohol polyethyleneglycol ethers. Brij™ 58 Surfactant is Polyoxyethylene(20) cetyl ether, and Brij™ 76 Surfactant is Polyoxyethylene(10) stearyl ether.

Other suitable nonreactive nonionic surfactants include polyethylene oxide condensates of one mole of alkyl phenol containing from about 6 to 12 carbon atoms in a straight or branched chain configuration, with about 3 to about 100 moles, preferably about 5 to about 40 moles, most preferably about 5 to about 20 moles of ethylene oxide to achieve the above defined HLB. Examples of nonreactive nonionic surfactants are the Igepal™ CO and CA series from Rhone-Poulenc. Igepal™ CO surfactants include nonylphenoxy poly(ethyleneoxy) ethanols. Igepal™ CA surfactants include octylphenoxy poly(ethyleneoxy) ethanols.

Another group of usable nonreactive nonionic surfactants include block copolymers of ethylene oxide and propylene oxide or butylene oxide with HLB values of about 6 to about 19, preferably about 9 to about 18, and most preferably about 10 to about 16. Examples of such nonionic block copolymer surfactants are the Pluronic™ and Tetronic™ series of surfactants from BASF. Pluronic™ surfactants include ethylene oxide-propylene oxide block copolymers. Tetronic™ surfactants include ethylene oxide-propylene oxide block copolymers.

Still other satisfactory nonreactive nonionic surfactants include but are not limited to sorbitan fatty acid esters, polyoxyethylene sorbitan fatty acid esters and polyoxyethylene stearates having HLBs of about 6 to about 19, preferably about 9 to about 18, and most preferably about 10 to about 16. Examples of such fatty acid ester nonionic surfactants are the Span™, Tween™, and Myrj™ surfactants from ICI. Span™ surfactants include $C_{12}$–$C_{18}$ sorbitan monoesters. Tween™ surfactants include poly(ethylene oxide) $C_{12}$–$C_{18}$ sorbitan monoesters. Myrj™ surfactants include poly(ethylene oxide) stearates.

1.b. Ethylenically-Unsaturated Copolymerizable Nonionic Surfactants

Suitable nonionic surfactants for incorporation in the polymerizable microemulsion compositions of the invention are ethylenically-unsaturated copolymerizable nonionic surfactants including but not limited to those falling within the general formula:

R—O—(R'O)$_m$—(EO)$_{(n-1)}$—CH$_2$CH$_2$OH where:
R is selected from the group consisting of (about $C_2$ to about $C_{18}$) alkenyl, acrylyl, acrylyl (about $C_1$ to about $C_{10}$) alkyl, methacrylyl, methacrylyl (about $C_1$ to about $C_{10}$) alkyl, vinylphenyl and vinylphenylene (about $C_1$ to about $C_6$) alkyl;

R'O is selected from the group consisting of bivalent alkyleneoxy groups derived from epoxy compounds having more than two carbon atoms, preferably three or four carbon atoms, such propylene oxide, butylene oxide, etc. and combinations thereof;

E is a bivalent ethylene radical;

m represents an integer of about 5 to about 100;
n represents an integer of about 5 to about 100; the ratio of m and n being from about 20:1 to about 1:20.

It will be understood that varying the ratio of m and n will vary the HLB of the polymerizable surfactant. The required HLB for the nonionic surfactant(s) of the present invention is from about 6 to about 19, preferably from about 9 to about 18, and most preferably from about 10 to about 16. Examples of such copolymerizable nonionic surfactants are the alkylene polyalkoxy ethanol surfactants available from PPG Industries under the tradenames "Mazon BSN" 185, 186 and 187. Mazon BSN™ surfactants include alkylene polyalkoxy ethanol.

2. Anionic Surfactants

Anionic surfactants normally include a hydrophobic moiety selected from the group consisting of (about $C_6$ to about $C_{20}$) alkyl, alkylaryl, and alkenyl groups and an anionic group selected from the group consisting of sulfate, sulfonate, phosphate, polyoxyethylene sulfate, polyoxythylene sulfonate, polyoxethylene phosphate and the alkali metal salts, ammonium salts, and tertiary amino salts of such anionic groups. A particular ethylenically-unsaturated copolymerizable surfactant which includes (about $C_2$ to about $C_{18}$) alkenyl polyoxypropylene or (about $C_2$ to about $C_{18}$) polyoxybutylene as a hydrophobic moiety and an anionic group of polyoxyethylene sulfate is also useful in the present invention to prepare microemulsions. Examples of additional anionic surfactants which are useful in the present invention are discussed below.

2.a. Nonreactive Anionic Surfactants

Nonreactive anionic surfactants which can be used in the present invention include but are not limited to alkyl or alkylaryl sulfates or sulfonates (about $C_6$ to about $C_{20}$) such as sodium lauryl sulfate (commercially available as Polystep™ B-3 from Stepan Co.) and sodium dodecyl benzene sulfonate, (commercially available as Siponate™ DS-10 from Rhone-Poulenc); polyoxyethylene (about $C_6$ to about $C_{20}$) alkyl or alkylphenol ether sulfates with the ethylene oxide repeating unit in the surfactant below about 30 units, preferably below about 20 units, most preferably below about 15 units, such as Polystepä B1 commercially available from Stepan Co. and Alipal™ EP110 and 115 from Rhone-Poulenc; (about $C_6$ to about $C_{20}$) alkyl or alkylphenoxy poly(ethyleneoxy)ethyl mono-esters and di-esters of phosphoric acid and its salts, with the ethylene oxide repeating unit in the surfactant below about 30 units, preferably below about 20 units, most preferably below about 15 units, such as Gafac™ PE-510 and Gafac™ RE-610 from GAF.

2.b. Ethylenically-Unsaturated Copolymerizable Anionic Surfactants

Suitable anionic surfactants for incorporation in the microemulsion compositions include but are not limited to ethylenically-unsaturated copolymerizable surfactants of the formula:

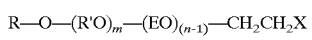

R—O—(R'O)$_m$—(EO)$_{(n-1)}$—CH$_2$CH$_2$X where:
R is selected from the group consisting of about $C_2$ to about $C_{18}$ alkenyl, acrylyl, acrylyl (about $C_1$ to about $C_{10}$) alkyl, methacrylyl, methacrylyl (about $C_1$ to about $C_{10}$) alkyl, vinylphenyl and vinylphenylene (about $C_1$ to about $C_6$) alkyl;

R'O is selected from the group consisting of bivalent alkyleneoxy groups derived from epoxy compounds having more than two carbon atoms, preferably three or four carbon atoms, such as propylene oxide and butylene oxide and mixtures of such alkyleneoxy groups;

E is a bivalent ethylene radical;

m represents an integer of about 5 to about 100;

n represents an integer of about 5 to about 100; the ratio of m and n being from about 20:1 to about 1:20.

It will be understood that varying the ratio of m and n will vary the HLB of the polymerizable surfactant. The required HLB for the anionic copolymerizable surfactants of the present invention, exclusive of the X-group, is from about 3 to about 16. X is an anionic group selected from the group consisting of sulfonate, sulfate, phosphate, and alkali metal salts or ammonium salts or tertiary amino salts of such anionic groups. An example of such a copolymerizable anionic surfactant is Mazon™ SAM 211 from PPG Industries, Inc.

3. Cationic Surfactants

Cationic surfactants useful in the present invention include but are not limited to quaternary ammonium salts in which at least one higher molecular weight group and two or three lower molecular weight groups are linked to a common nitrogen atom to produce a cation, and wherein the electrically-balancing anion is selected from the group consisting of a halide (bromide, chloride, etc.), acetate, nitrite, and lower alkosulfate (methosulfate etc.). The higher molecular weight substituent(s) on the nitrogen is/are often (a) higher alkyl group(s), containing about 10 to about 20 carbon atoms, and the lower molecular weight substituents may be lower alkyl of about 1 to about 4 carbon atoms, such as methyl or ethyl, which may be substituted, as with hydroxy, in some instances. One or more of the substituents may include an aryl moiety or may be replaced by an aryl, such as benzyl or phenyl. Among the possible lower molecular weight substituents are also lower alkyls of about 1 to about 4 carbon atoms, such as methyl and ethyl, substituted by lower polyalkoxy moieties such as polyoxyethylene moieties, bearing a hydroxyl end group, and falling within the general formula:

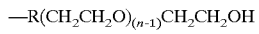

$$-R(CH_2CH_2O)_{(n-1)}CH_2CH_2OH$$

where R is a $C_1$ to $C_4$ divalent alkyl group bonded to the nitrogen, and n represents an integer of about 1 to about 15. Alternatively, one or two of such lower polyalkoxy moieties having terminal hydroxyls may be directly bonded to the quaternary nitrogen instead of being bonded to it through the previously mentioned lower alkyl. Examples of useful quaternary ammonium halide surfactants for use in the present invention include but are not limited to methyl-bis(2-hydroxyethyl)coco-ammonium chloride or oleyl-ammonium chloride, (Ethoquad™ C/12 and O/12, respectively) and methyl polyoxyethylene (15) octadecyl ammonium chloride (Ethoquad™ 18/25) from Akzo Chemical Inc.

IV. Thickening Agents

The thickening agents useful in the present invention include hydrophilic polymers formed partially or completely from acrylic acid monomer. Homopolymers of acrylic acid are generally considered preferred, although hydrophilic copolymers of acylic acid, preferably those containing at least about 20%, and preferably at least 80%, residues of acrylic acid, are also considered useful. The molecular weight of the thickening agent may be between about 200,000 and 800,000, with 400,000 to 700,000 being considered preferred.

Biomedical Electrodes

Biomedical electrodes employing polymerized microemulsion PSA's of the present invention having electrolyte contained therein are useful for diagnostic, (including monitoring), and therapeutic purposes. In its most basic form, a biomedical electrode comprises a conductive medium contacting mammalian skin and a means for electrical communication interacting between the conductive medium and electrical diagnostic, therapeutic, or electrosurgical equipment.

Figure 2:
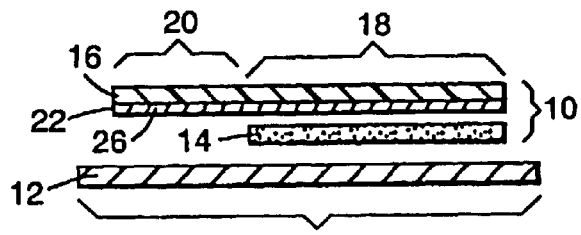
FIG. 2 is a cross-sectional view of the biomedical electrode of FIG. 1.

FIGS. 1 and 2 show either a disposable diagnostic electrocardiogram (ECG or EKG) or a transcutaneous electrical nerve stimulation (TENS) electrode 10 on a release liner 12. Electrode 10 includes a field 14 of a biocompatible and adhesive conductive medium for contacting mammalian skin of a patient upon removal of protective release liner 12. Electrode 10 includes means for electrical communication 16 comprising a conductor member having a conductive interface portion 18 contacting field 14 of conductive medium and a tab portion 20 extending beyond field 14 of conductive medium for mechanical and electrical contact with electrical instrumentation (not shown). Means 16 for electrical communication includes a conductive layer 26 coated on at least the side 22 contacting field 14 of conductive medium.

It is foreseen that a typical conductor member 16 will comprise a strip of material having a thickness of about 0.05–0.2 millimeters, such as polyester film and have a coating 26 on side 22 of silver/silver chloride of about 2.5–12 micrometers, and preferably about 5 micrometers thick thereon. Presently preferred for conductor member 16 are polyester films commercially available as "Scotchpar" commercially available from 3M Company of St. Paul, Minn. or "Melinex" 505-300, 329, or 339 film from ICI Americas of Hopewell, Va. commercially available as "Mellinex" 505-300, 329, or 339 film from ICI Americas of Hopewell, Va. coated with a silver/silver chloride ink commercially available as "R-300" ink from Ercon, Inc. of Waltham, Mass. A TENS conductor member 16 can be made of a nonwoven web, such as a web of polyester/cellulose fibers commercially available as "Manniweb" web from Lydall, Inc. of Troy, N.Y. and have a carbon ink layer 26 commercially available as "SS24363" ink from Acheson Colloids Company of Port Huron, Mich. on side 22 thereof. To enhance mechanical contact between an electrode clip (not shown) and conductor member 16, an adhesively-backed polyethylene tape can be applied to tab portion 20 on the side opposite side 22 having the conductive coating 26. A surgical tape commercially available from 3M Company as "Blenderm" tape can be employed for this purpose.

Alternatively, conductor member can be a multi-layered construction of a nonconductive, flexible polymeric film having a sulfur-reactive surface, a metallic layer deposited on and interacting with the surface and an optional metallic halide layer, according to the disclosure of U.S. Pat. No. 5,506,059, the disclosure of which is incorporated by reference herein. The conductive interface portion 18 of member 16 comprises a metallic layer deposited on an sulfur-reactive surface on at least the side of polymeric film substrate facing field 14 of the polymerized microemulsion PSA and the optional metallic halide layer coated on the metallic layer and contacting field 14. Because depolarizing is not needed for the mechanical and electrical contact with electrical equipment, optional metallic halide layer does not need to extend to tab portion 20.

Alternatively, conductor member 16 can be a multi-layered construction of a nonconductive, flexible polymeric film, an electrically conductive layer, and a thin, conformable depolarizing layer of inorganic oxide, preferably manganese dioxide. Alternatively, conductor member 16 is a multilayered construction of film with electrically conductive and depolarizing layers blended together. Both of these alternative embodiments can be constructed according to the disclosure of U.S. Pat. No. 5,505,200, the disclosure of which is incorporated by reference herein. The conductive interface portion of member comprises an electrically conductive layer coated on at least the side of polymeric film facing field 14 of polymerized microemulsion PSA and the thin, depolarizing layer coated on the electrically conductive layer and contacting field 14. Because depolarizing is not needed for the mechanical and electrical contact with electrical equipment, depolarizing layer not extend to tab portion 20.

Non-limiting examples of biomedical electrodes which can use polymerized microemulsion PSA's of the present invention, either as conductive or non-conductive adhesive fields include electrodes disclosed in U.S. Pat. Nos. 4,524,087; 4,539,996; 4,554,924; 4,848,353 (all Engel); U.S. Pat. No. 4,846,185 (Carim); U.S. Pat. No. 4,771,713 (Roberts); U.S. Pat. No. 4,715,382 (Strand); U.S. Pat. No. 5,012,810 (Strand et al.); and U.S. Pat. No. 5,133,356 (Bryan et al.), the disclosures of which are incorporated by reference herein.

In those electrodes that also employ border areas of a non-conductive biocompatible pressure sensitive adhesive, such border areas become optional with the use of polymerized microemulsion PSA's of the present invention. Desirably, such border areas can be eliminated because it is no longer necessary.

In some instances, the means for electrical communication can be an electrically conductive tab extending from the periphery of the biomedical electrodes such as that seen in U.S. Pat. No. 4,848,353 or can be a conductor member extending through a slit or seam in an insulating backing member, such as that seen in U.S. Pat. No. 5,012,810. Otherwise, the means for electrical communication can be an eyelet or other snap-type connector such as that disclosed in U.S. Pat. No. 4,846,185. Further, the means for electrical communication can be a lead wire such as that seen in U.S. Pat. No. 4,771,783. Regardless of the type of means for electrical communication employed, a polymerized microemulsion PSA of the present invention, containing an electrolyte, can reside as a field of conductive adhesive on a biomedical electrode for diagnostic (including monitoring), therapeutic, or electrosurgical purposes.

Another type of diagnostic procedure which can employ a biomedical electrode of the present invention is the longer term monitoring of electrical wave patterns of the heart of a patient to detect patterns of abnormality. A preferred biomedical electrode structure is disclosed in U.S. Pat. No. 5,012,810 (Strand et al.) which is incorporated by reference. The polymerized microemulsion PSA of the present invention can be used as the ionically conductive medium in any of the embodiments shown therein. Preferably, the polymerized microemulsion PSA of the present invention is used as the field of conductive adhesive in the biomedical electrode of the embodiment shown in FIGS. 2, 3, and 4 of U.S. Pat. No. 5,012,810.

Figure 3:
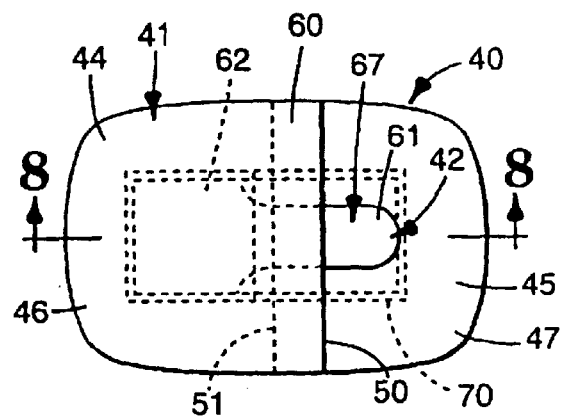
FIG. 3 is a top plan view of a monitoring biomedical electrode containing a polymerized microemulsion PSA of the present invention, used for longer term diagnosis or monitoring of heart conditions.
Figure 4:
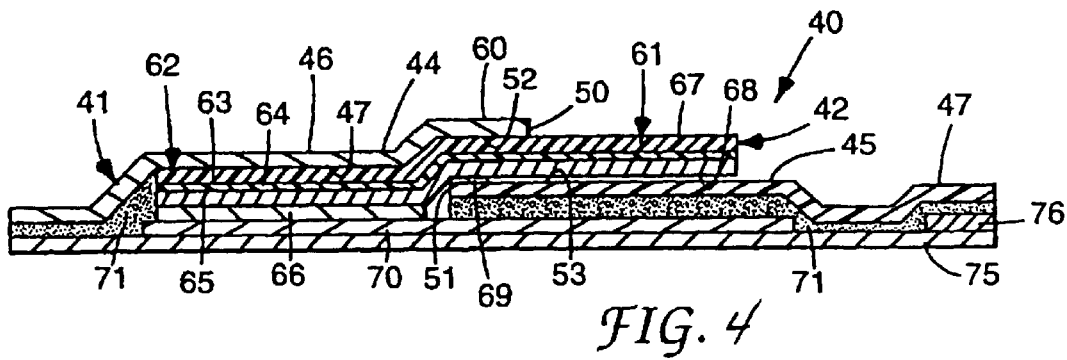
FIG. 4 is a cross-sectional view of the monitoring biomedical electrode of FIG. 3.

FIGS. 3 and 4 substantially correspond to FIGS. 2 and 3, respectively, of U.S. Pat. No. 5,012,810. Electrode 40 includes an insulator construction 41, and a conductor member 42.

The insulator construction 41 includes first and second sections 44 and 45 which, together, define opposite sides 46 and 47 of the insulator construction 41. As seen in FIG. 3, each section 44 and 45 includes an elongate edge portion 50 and 51, respectively. The edge portions 50 and 51 each include a border portion 52 and 53, respectively, which comprise a peripheral portion of each section 44 and 45, respectively, and extending along edges 50 and 51, respectively. In that manner, sections 44 and 45 are oriented to extend substantially parallel to one another, with edge portions 50 and 51 overlapping one another such that border portions 52 and 53 overlap. A seam 60 is created between edge portions 50 and 51. "Substantially parallel" does not mean that the sections 44 and 45 are necessarily precisely parallel. They may be out of precise coplanar alignment due, for example, to the thickness of the conductor member 42.

Conductor member 42 is substantially similar to biomedical electrical conductor 16 described above, having a tab portion 61 corresponding to tab portion 20 described above and a pad portion 62 corresponding to conductive interface portion 18 described above. Like biomedical electrical conductor member 16, conductor member 42 can be any of the embodiments disclosed above. In this embodiment, conductor member 42 is a multi-layered construction of a nonconductive, flexible organic polymer substrate 63 having an organosulfur surface 64, a metallic layer 65 adhered thereto, and, optionally, a metallic halide layer 66, produced according to the disclosure of U.S. Pat. No. 5,506,059 described above.

The pad portion 62 of member 42 comprises the portion of the metallic film facing field 70 of conductive adhesive, optionally with metallic halide layer 66 contacting field 70. Because depolarizing is not needed for the mechanical and electrical contact with electrical equipment, metallic halide layer 66 need not extend to tab portion 61. Optionally, an adhesively-backed polyethylene tape can be applied to tab portion 61 in the same manner as that for the embodiment of FIGS. 1 and 2 in order to enhance mechanical contact.

In general, electrode 40 is constructed such that tab portion 61 of conductor member 42 projects through seam 60 and over a portion of surface or side 46. As a result, as seen in FIGS. 3 and 4 pad portion 62 of conductor member 42 is positioned on one side 47 of insulator construction 41, and the tab portion 61 of conductor member 42 is positioned on an opposite side 46 of insulator construction 41. It will be understood that except where tab portion 61 extends through seam 60, the seam may be sealed by means of an adhesive or the like.

As seen in FIG. 4, lower surface 68 of tab portion 61 is shown adhered in position to section 45, by means of double-stick tape strip 69. That is, adhesion in FIG. 1 between the tab portion 61 and section 45 is by means of adhesive 69 underneath tab portion 61, rather than on top as shown in FIG. 4.

In FIG. 4, a field 70 of conductive adhesive of polymerized microemulsion PSA of the present invention is shown positioned generally underneath conductive member 42. Optionally, field 70 of conductive adhesive will be surrounded by a field 71 of biocompatible skin adhesive also applied to insulator construction 41 the side thereof having pad portion 62 thereon. However, because of the hydrophobic pressure sensitive adhesive bulk properties of the polymerized microemulsion PSA of the present invention, field 71 can be eliminated or can be also the polymerized microemulsion PSA of the present invention.

In FIG. 4, a layer of release liner 75 is shown positioned against that side of electrode 40 which has optional skin adhesive 71, conductive adhesive 70 and pad portion 62 thereon. Optionally as shown in FIG. 4, a spacer 76 or tab 76 can be positioned between release liner 75 and a portion of insulator construction 41, to facilitate the separation.

A variety of release liners 75 may be utilized; for example, a liner comprising a polymer such as a polyester or polypropylene material, coated with a silicone release type coating which is readily separable from the skin adhesive and conductive adhesive.

A variety of materials may be utilized to form the sections 44 and 45 of the insulator construction 41. In general, a flexible material is preferred which will be comfortable to the user, and is relatively strong and thin. Preferred materials are polymer foams, especially polyethylene foams, nonwoven pads, especially polyester non-wovens, various types of paper, and transparent films. Nonlimiting examples of transparent films include polyester film such as a polyester film commercially available as "Melinex" polyester film from ICI Americas, Hopewell, Va. having a thickness of 0.05 mm and a surgical tape commercially available from 3M Company as "Transpore" unembossed tape.

The most preferred materials are non-woven pads made from melt blown polyurethane fiber, which exhibit exceptional flexibility, stretch recovery and breathability. Melt blown polyurethane materials usable in insulator construction 41 in electrodes according to the present invention are generally described in European Patent Publication 0 341 875 (Meyer) and corresponding U.S. Pat. No. 5,230,701 (Meyer et al.), incorporated herein by reference.

Optionally the insulator construction has a skin adhesive on its surface contacting the remainder of the electrode 40.

Preferred web materials (melt blown polyurethanes) for use in insulator construction 41 have a web basis weight of about 60–140 g/m$^2$ (preferably about 120 g/m$^2$). Such materials have an appropriate tensile strength and moisture vapor transmission rate. A preferred moisture vapor transmission rate is about 500–3000 grams water/m$^2$/24 hours (preferably 500–1500 grams water/m$^2$/24 hours) when tested according to ASTM E96-80 at 21° C. and 50% relative humidity. An advantage to such materials is that webs formed from them can be made which exhibit good elasticity and stretch recovery. This means that the electrode can stretch well, in all directions, with movement of the subject, without loss of electrode integrity and/or failure of the seal provided by the skin adhesive. Material with a stretch recovery of at least about 85%, in all directions, after stretch of 50% is preferred.

It will be understood that a variety of dimensions may be utilized for the biomedical electrode disclosed herein. Generally an insulator construction of about 3.5–4.5 cm by 5.5–10 cm will be quite suitable for typical foreseen applications. A thickness of about 200 to 600 mm provides for adequate strength and a desired low relief or profile, in typical applications.

It will also be understood that a variety of materials may be utilized as the skin adhesive, if polymerized microemulsion PSA is not employed or if the field 71 is not eliminated. Typically, acrylate ester adhesives will be preferred. Acrylate ester copolymer adhesives are particularly preferred. Such material are generally described in U.S. Pat. Nos. 2,973,826; Re 24,906; Re 33,353; 3,389,827; 4,112,213; 4,310,509; 4,323,557; 4,732,808; 4,917,928; 4,917,929; and European Patent Publication 0 051 935, all incorporated herein by reference.

In particular, an adhesive copolymer having from about 95 to about 97 weight percent isooctyl acrylate and from about 5 to about 3 percent acrylamide and having an inherent viscosity of 1.1–1.25 dl/g is presently preferred.

Adhesive useful as for adhesive 69 can be any of the acrylate ester adhesives described above in double stick tape form. A presently preferred adhesive is the same adhesive as presently preferred for the skin adhesive except having an inherent viscosity of about 1.3–1.45 dl/g.

For the field 70 of conductive adhesive, conductive adhesives such as those described above as useful for field 14 of conductive medium are preferred.

It will be understood that the dimensions of the various layers, and their conformation during association, are shown somewhat exaggerated in FIG. 4, to facilitate an understanding of the construction. In general, an overall substantially flat appearance with only a very minor "s" type bend in the conductive member 42 is accommodated by the arrangement, despite the multilayered construction of member 42.

Another biomedical electrode construction is shown in FIG. 9 in cross-section. Electrode 80 has a nonconductive backing 82 having an opening 83 covered by snap 84 though which stud or eyelet 85 protrudes. The snap 84 is secured to eyelet 85 to provide a point of electrical connection to electrical instrumentation. Covering eyelet 84 and backing 82 is a field 86 of the polymerized microemulsion PSA of the present invention. A release liner 88 protects the PSA field 86 prior to use. Backing 82 can be made of the same or similar materials as insulator construction 41. Eyelet 85 can be a plastic, metallic plated eyelet (such as an ABS plastic eyelet silver-plated and chlorided and commercially available from Micron Products of Fitchburg, Mass.). Snap 84 can be a metallic snap (such as stainless steel eyelet No. 304 commercially available from Eyelets for Industry of Thomason, Conn.). Electrode 80 is particularly preferred because the polymerized microemulsion PSA of the present invention can serve both as the biocompatible skin adhesive and as the ionically conductive medium in the electrode 80. By comparison, a monitoring electrode that requires a skirt of biocompatible skin adhesive to surround a nonadhesive but ionically conductive gel pad, such as a Red Dot™ brand electrode commercially available from 3M Company is a more complicated construction.

Figure 5:
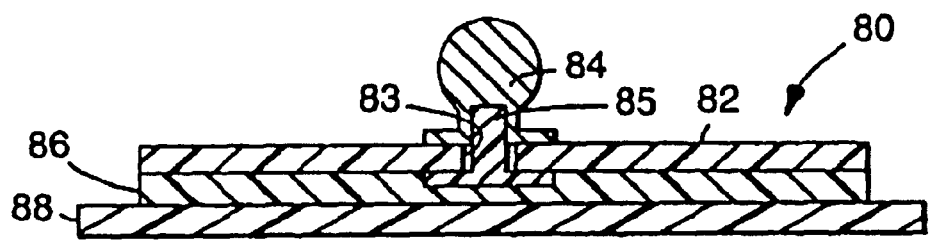
FIG. 5 is a cross-sectional view of another monitoring biomedical electrode containing a polymerized microemulsion PSA of the present invention and a stud connector.

Other examples of biomedical electrodes which can use the present invention as a conductive adhesive include electrodes disclosed in U.S. Pat. Nos. 4,527,087; 4,539,996; 4,554,924; 4,848,353 (all Engel); U.S. Pat. No. 4,846,185 (Carim); U.S. Pat. No. 4,771,713 (Roberts); U.S. Pat. No. 4,715,382 (Strand); U.S. Pat. No. 5,133,356 (Bryan et al.), the disclosures of which are incorporated by reference herein. Methods of making such electrodes are disclosed in such patents, except that polymerized microemulsion PSA of the present invention can be substituted for the field of conductive adhesive and optionally also the field of skin adhesive disclosed in such patents. Among these various electrode constructions is an electrode construction particularly preferred as that shown in FIGS. 4 and 5 of U.S. Pat. No. 4,848,353 (Engel) in which the electrically conductive adhesive 36 is replaced by the polymerized microemulsion PSA of the present invention, and in which the biocompatible PSA 32 is optionally eliminated or optionally replaced by the polymerized microemulsion PSA of the present invention.

When used for diagnostic EKG procedures, electrodes shown in FIGS. 1 and 2 or those electrodes shown in U.S. Pat. No. 4,539,996 are preferred. When used for monitoring electrocardiogram (ECG) procedures, electrodes shown in FIGS. 3 and 4 and those disclosed in U.S. Pat. Nos. 4,539,996, 4,848,353, 5,012,810 and 5,133,356 are preferred.

In some instances, the biomedical electrical conductor can be an electrically conductive tab extending from the periphery of the biomedical electrodes such as that seen in U.S. Pat. No. 4,848,353 or can be a conductor member extending through a slit or seam in a insulating backing member, such as that seen in U.S. Pat. No. 5,012,810. Otherwise, the means for electrical communication can be an eyelet or other snap-type connector such as that disclosed in U.S. Pat. No. 4,846,185. Alternatively, an electrically conductive tab such as that seen in U.S. Pat. No. 5,012,810 can have an eyelet or other snap-type connector secured thereto.

Medical Skin Coverings

Medical skin coverings employing polymerized microemulsion PSA's of the present invention, optionally having antimicrobial and other biologically active agents contained therein, are useful for treatment of mammalian skin or mammalian skin openings, preferably against the possibility of infection and also for the transmission of moisture vapor and exudate from skin.

Figure 6:
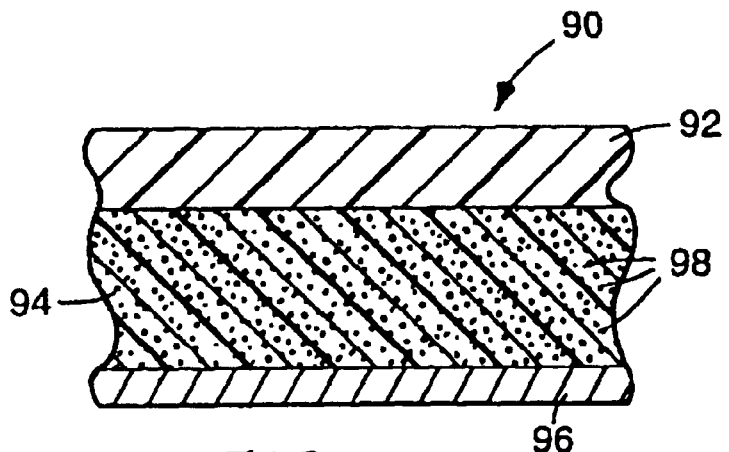
FIG. 6 is a sectional view of a medical mammalian skin covering containing polymerized microemulsion PSA of the present invention.

FIG. 6 shows a sectional view of a medical skin covering 90 having a backing material 92, a layer 94 of polymerized microemulsion PSA of the present invention coated on backing material 92, and protected until use by a release liner 96. Preferably, antimicrobial 98 is contained in layer 94 by adding agent 98 prior to coating on backing material 92. Alternatively, layer 94 can be used as a caulkable sealant according to U.S. Pat. No. 4,931,282 (Asmus et al.), the disclosure of which is incorporated by reference herein.

For use, the release liner 96 is removed and the layer 94 of polymerized microemulsion PSA can be applied to the skin of the patient as a part of a medical tape, a wound dressing, a bandage of general medicinal utility, or other medical device having water moisture absorbing properties.

The adhesive layer 94 may be coated on a layer of backing material 92 selected from any of several backing materials having a high moisture vapor transmission rate for use as medical tapes, dressings, bandages, and the like. Suitable backing materials include those disclosed in U.S. Pat. Nos. 3,645,835 and 4,595,001, the disclosures of which are incorporated by reference. Other examples of a variety of films commercially available as extrudable polymers include "Hytrel™ 4056" and "Hytrel™ 3548" branded polyester elastomers available from E. I. DuPont de Nemours and Company of Wilmington, Del., "Estane" branded polyurethanes available from B. F. Goodrich of Cleveland, Ohio or "Q-thane" branded polyurethanes available from K. J. Quinn & Co. of Maiden, Mass.

The layer 94 of polymerized microemulsion PSA combined with a layer 92 of suitable backing material can be used as a dressing.

Polymerized microemulsion PSA's of the present invention have excellent moisture vapor transmission properties. Moist vapor transmission rates of adhesive layer 94 approach (i.e., within 80%) and sometimes exceed the moisture vapor transmission rate of backing layer 92, such that moisture vapor and body exudate can be readily transmitted from mammalian skin.

Polymerized microemulsion PSAs of the present invention can be used as discrete gel particles dispersed in a continuous pressure-sensitive adhesive matrix to form a two phase composite useful in medical applications, as described in U.S. Pat. No. 5,270,358, the disclosure of which is incorporated by reference herein.

The adhesive layer 94 can be coated on the backing layer 92 by a variety of processes, including, direct coating, lamination, and hot lamination. The release liner 96 can thereafter be applied using direct coating, lamination, and hot lamination.

The methods of lamination and hot lamination involve the application of pressure, or heat and pressure, respectively, on the layer of adhesive layer 94 to the backing material layer 92. The temperature for hot lamination ranges from about 50° C. to about 250° C., and the pressures applied to both lamination and hot lamination range from 0.1 kg/cm$^2$ to about 50 kg/cm$^2$.

Pharmaceutical Delivery Devices

Pharmaceutical delivery devices employing hydrophilic, pressure-sensitive adhesive compositions of the present invention, optionally having a topical, transdermal, or iontophoretic therapeutic agent and excipients, solvents, or penetration enhancing agents contained therein, are useful for delivery of pharmaceuticals or other active agents to or through mammalian skin.

Figure 7:
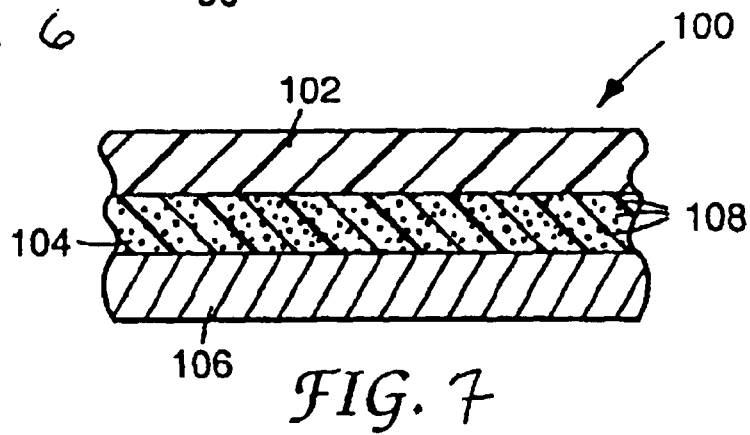
FIG. 7 is a sectional view of a pharmaceutical delivery device containing a polymerized microemulsion PSA of the present invention.

FIG. 7 shows a sectional view of a transdermal or topical drug delivery device 100 having a backing layer 102, a layer 104 containing polymerized microemulsion PSA of the present invention coated thereon and protected by a release liner 106. Other layers can be present between layer 102 and layer 104 to house pharmaceuticals or other therapeutic agents. Otherwise, as shown in FIG. 7, pharmaceutical and other agents 108 are dispersed in adhesive layer 104.

The backing layer 102 can be any backing material known to those skilled in the art and useful for drug delivery devices. Non-limiting examples of such backing materials are polyethylene, ethylene-vinyl acetate copolymer, polyethylene-aluminum-polyethylene composites, and ScotchPak™ brand backings commercially available from 3M Company.

The release liner 106 can be any release liner material known to those skilled in the art. Non-limiting examples of such release liners commercially available include siliconized polyethylene terephthalate films commercially available from H. P. Smith Co. and fluoropolymer coated polyester films commercially available from 3M under the brand ScotchPak™ release liners.

The therapeutic agent 108 can be any therapeutically active material known to those skilled in the art and approved for delivery topically to or transdermally or iontophoretically through the skin of a patient. Non-limiting examples of therapeutic agents useful in transdermal delivery devices are any active drug or salts of those drugs, used in topical or transdermal applications, or growth factors for use in enhancing wound healing. Other therapeutic agents identified as drugs or pharmacologically active agents are disclosed in U.S. Pat. Nos. 4,849,224 and 4,855,294, and PCT Patent Publication WO 89/07951.

Excipients or penetration enhancing agents are also known to those skilled in the art. Non-limiting examples of penetration enhancing agents include ethanol, methyl laurate, oleic acid, isopropyl myristate, and glycerol monolaurate. Other penetration enhancing agents known to those skilled in the art are disclosed in U.S. Pat. Nos. 4,849,224; and 4,855,294 and PCT Patent Publication WO 89/07951.

The method of manufacturing a transdermal delivery device depends on its construction.

The drug delivery device 100 shown in FIG. 7 can be prepared using the following general method. A solution is prepared by dissolving the therapeutic agent 108 and such optional excipients as are desired in a suitable solvent and mixed into the microemulsion prior to forming the composition, during the formation of the composition, or directly into the already formed composition. The resulting loaded adhesive composition is coated on the backing layer 102. A release liner 106 is applied to cover loaded adhesive layer 104.

EXAMPLES

A first mixture was formed by mixing two hydrophilic monomers, namely 10.19 grams of acrylic acid, with 23.78 grams of polyoxyethylene acrylate. The latter is commercially available as AM 90G ester from Shin-Nakamura Chemical Co. Ltd. of Wakayama, Japan. Then 14.89 grams of isooctyl acrylate in the role of a hydrophobic monomer was added to the first mixture so as to form a second mixture. Then 11.6 grams of a polymerizable anionic surfactant, commercially available as SAM 211 from PPG Industries, was added to the second mixture so as to form a third mixture. Then 0.05 grams of an initiator capable of inducing polymerization was added to the third mixture so as to form a fourth mixture. Specifically, 2,2-dimethoxy-2-phenylacetophenone, commercially available from Ciba-Geigy of Hawthorne, N.Y. as Irgacure™ 651, was used. Next, an aqueous mixture was prepared containing 19.2 grams of water and 0.8 gram of KCl. The aqueous mixture and the fourth mixture was mixed together to form a microemulsion.

In each of Examples 1–6, to this basic microemulsion a quantity of a substance on trial as a thickening polymer was further added so as to try to form a thickened microemulsion. Material, quantities and observations about these experiments are summarized in Table 1.

TABLE 1

| Example | Trial substance | Weight, gram added | Viscosity, cps | Observation |
|---|---|---|---|---|
| 1 | Polyacrylic acid Solution | 6.0 | 300 | clear |
| 2 | Polyacrylic acid Solution | 4.0 | 100 | clear |
| 3 | Polyvinyl pyrrolidone | 1.0 | 475 | milky |
| 4 | Polyvinyl pyrrolidone | 1.0 | 75 | frosty |
| 5 | Polyvinyl pyrrolidone | 1.0 | 100 | gel particles |
| 6 | Guar gum | 0.2 | 75 | gel particles |

Example 1

The trial substance in this example was a 17% aqueous polyacrylic acid solution having a molecular weight approximately 550,000. The trial substance was prepared from monomer using standard synthetic techniques. Specifically, polymerization was initiated by the heat activated initiator potassium persulfate, and the reaction was run under a nitrogen atmosphere at 76° C. When the trial substance was added to the microemulsion, the microemulsion remained clear and stable, while the viscosity increased to 300 cps, which rendered it very readily processable using conventional techniques.

Example 2

The trial substance in this example is commercially available as Good-rite K-702 from B. F. Goodrich of Cleveland, Ohio, and is a 25% aqueous polyacrylic acid solution having a molecular weight of approximately 240,000. Once again, the microemulsion remained clear and stable, however, a much larger amount of thickening agent was required to achieve a smaller increase in viscosity.

Example 3

The trial substance in this example is commercially available as K-30 from ISP Technologies of Wayne, N.J., and is a polyvinyl pyrrolidone (PVP) having a molecular weight of approximately 66,000. This is a failed example; the solution took on a milky appearance consistent with the destabilization of the microemulsion, and was unusable. Although PVP, like polyacrylic acid, is a vinyl polymer with a polar moiety appended to the backbone. It nonetheless appears unsuitable as a thickening agent and demonstrates the criticality of the acrylic acid group.

Example 4

The trial substance in this example is commercially available as K-90 from ISP Technologies, and is a polyvinyl pyrrolidone (PVP) having a molecular weight of approximately 1,500,000. This is an additional failed example; the solution took on a frosty appearance consistent and was unusable.

Example 5

The trial substance in this example is commercially available as K-120 from ISP Technologies, and is a polyvinyl pyrrolidone (PVP) having a molecular weight of approximately 3,500,000. This is an additional failed example; the solution showed visible gel particles and was unusable.

Example 6

The trial substance in this example was guar gum, a natural polymer of molecular weight of approximately 220,000, formed from galactose and mannose units. It is commercially available in powder form from Rhone Poulenc of Vernon, Tex. This is an additional failed example; the solution showed visible gel particles and was unusable. It is presented to show that a compound which might be turned to for thickening in conventional conductive adhesives is ineffective in the special case of bicontinuous conductive adhesives.

Example 7

A microemulsion was prepared as follows. A first mixture was formed by mixing two hydrophilic monomers, 14 grams of acrylic acid with 14 gram of polyoxyethylene acrylate, commercially available as AM 90G ester from Shin-Nakamura Chemical Co. Ltd. of Wakayama Japan. To this was added 14 grams of isooctyl acrylate in the role of a hydrophobic monomer. To this second mixture was added 18 grams of a surfactant Brij™ 97, available from ICI to form a third mixture. Then 0.5 grams of Irgacure™ 2959 available from Ciba Gigy Corp., was added to form a fourth mixture. An aqueous mixture was then prepared containing 23 grams water, 1.2 grams KCl and 10 grams of propylene glycol. The aqueous mixture and the fourth mixture were combined together to for a microemulsion.

To the microemulsion was added a 17% aqueous polyacrylic acid solution having a molecular weight approximately 550,000, prepared according to Example 1. When the solution was added to the microemulsion, the microemulsion remained clear and stable and the viscosity increased to approximately 200 cps, readily processable using conventional techniques.

Example 8

The thickened microemulsion of Example 1 was then coated using a knife coater onto a release liner as substrate. The knife was set so that a 25 mil (0.64 mm) thick coating was obtained. Polymerization was induced in the coated microemulsion by exposure to ultraviolet radiation using a 350 Blacklight, commercially available from Sylvania of Danvers, Mass. A total dose of 1800 mJ/cm$^2$ was applied over approximately 7 minutes, forming a conductive, bicontinuous adhesive. This conductive adhesive had an excellent adhesion to human skin.

We claim:

1. A polymerizable composition comprising:
   (a) an aqueous microemulsion comprising one or more hydrophobic monomers, one or more hydrophilic and/or amphiphilic monomers, one or more initiators; and
   (b) at least one thickening agent comprising a polymer or copolymer of acrylic acid, having a molecular weight between about 200,000 and about 800,000.

2. The polymerizable composition of claim 1 wherein the thickening agent comprises a substantially linear polymer.

3. The polymerizable composition of claim 1 wherein the polymer comprises at least about 20 weight percent acrylic acid monomer.

4. The polymerizable composition of claim 1 wherein the polymer comprises at least about 80 weight percent acrylic acid monomer.

5. The polymerizable composition of claim 1 further comprising one or more water-soluble or water-dispersible additives.

6. The polymerizable composition of claim 5 wherein at least one of the water-soluble or water-dispersible additives is selected from the group consisting of electrolytes, plasticizers, antimicrobial agents, therapeutic agents, and combinations thereof.

7. A pressure sensitive composition comprising a polymerized product of the polymerizable composition according to claim 1.

8. A polymerizable composition comprising:
   (a) an aqueous microemulsion comprising one or more hydrophobic monomers, one or more hydrophilic and/or amphiphilic monomers, one or more initiators; and
   (b) a thickening agent comprising a solution of a polymer or copolymer of acrylic acid having a molecular weight between about 200,000 and about 800,000.

9. The polymerizable composition of claim 8 wherein the polymer or copolymer comprises at least about 20 weight percent acrylic acid monomer.

10. The polymerizable composition of claim 8 wherein the polymer or copolymer comprises at least about 80 weight percent acrylic acid monomer.

11. The polymerizable composition of claim 8 wherein the thickening agent comprises polyacrylic acid.

12. The polymerizable composition of claim 8 further comprising one or more water-soluble or water-dispersible additives.

13. The polymerizable composition of claim 12 wherein at least one of the water-soluble or water-dispersible additives is selected from the group consisting of electrolytes, plasticizers, antimicrobial agents, therapeutic agents, and combinations thereof.

14. A pressure sensitive composition comprising a polymerized product of the polymerizable composition of claim 8.

15. A method of forming a polymerized microemulsion pressure sensitive adhesive in contact with a substrate, comprising the steps of:
   (1) providing an aqueous microemulsion comprising one or more hydrophobic monomers, one or more hydrophilic and/or amphiphilic monomers and one or more initiators;
   (2) combining the aqueous microemulsion with at least one thickening agent comprising a polymer or copolymer of acrylic acid having a molecular weight between about 200,000 and about 800,000;
   (3) coating the thickened microemulsion onto the substrate; and
   (4) irradiating the microemulsion in order to form the pressure sensitive adhesive in contact with the substrate.

16. The method of claim 15 wherein the thickening agent comprises a substantially linear polymer.

17. The method of claim 15 wherein the polymer comprises at least about 20 weight percent acrylic acid monomer.

18. The method of claim 15 wherein the polymer comprises at least about 80 weight percent acrylic acid monomer.

19. The method of claim 15 wherein the irradiation is ultraviolet radiation in the range of 280 nm to 400 nm.

20. A method of forming a polymerized microemulsion pressure sensitive adhesive in contact with a substrate, comprising the steps of:
   (1) mixing hydrophilic monomer(s) and/or amphiphilic monomer(s) in a weight percent ratio of from about 100/0 to about 0/100 to form a first mixture;
   (2) mixing hydrophobic monomer(s), having a glass transition temperature suitable for forming a hydrophobic pressure sensitive adhesive, into the first mixture in a weight percent ratio of from about 80/20 to about 10/90 hydrophobic monomers/first mixture to form a second mixture;
   (3) mixing surfactant(s) into the second mixture in a weight percent ratio of from about 5/95 to about 30/70 surfactant/second mixture to form a third mixture;
   (4) mixing initiator(s) into the third mixture in a weight percent ratio of from about 0.01/99.99 to about 2/98 initiator/third mixture to form a fourth mixture;
   (5) independently, mixing water and water-soluble or water-dispersible additives together in a weight percent ratio of from about 100/0 to about 80/20 to form an aqueous mixture;
   (6) mixing the aqueous mixture and the fourth mixture together in a weight percent ratio of from 5/95 to about 50/50 aqueous mixture/fourth mixture to form a microemulsion;
   (7) mixing the microemulsion with a thickening agent comprising a polymer or copolymer of acrylic acid monomer having a molecular weight between about 200,000 and about 800,000 together in a weight ratio of from about 0.5/99.5 to about 5/95 to form a thickened microemulsion;
   (8) coating the thickened microemulsion onto the substrate; and
   (9) irradiating the microemulsion in order to form the pressure sensitive adhesive in contact with the substrate.

21. The method of claim 20 wherein the water-soluble or water dispersible additives are selected from the group consisting of electrolytes, plasticizers, antimicrobial agents, therapeutic agents, and combinations thereof.

* * * * *